INVENTORS.
WALTER R. SPOFFORD
MORTON G. DAVIS
By D. Emmett Thompson
ATTORNEY.

INVENTORS.
WALTER R. SPOFFORD
MORTON G. DAVIS
By- D. Emmett Thompson
ATTORNEY.

United States Patent Office 3,436,725
Patented Apr. 1, 1969

3,436,725
LOOP DETECTOR
Walter R. Spofford, Fayetteville, and Morton G. Davis, Camillus, N.Y., assignors to Crouse-Hinds Company, Syracuse, N.Y., a corporation of New York
Filed Jan. 3, 1966, Ser. No. 518,176
Int. Cl. C08g 1/01
U.S. Cl. 340—38                                            4 Claims

ABSTRACT OF THE DISCLOSURE

Disclosed is an improved self-adjusting circuit for a magnetic vehicle detector of the phase shift type wherein the bias for a variable threshold bistable circuit is provided by a resistor capacitor circuit having a long time constant which will respond to slow changes in the ambient conditions to maintain the bistable circuit in a first conductivity state but will not respond to a similar rapid change caused by a vehicle in the proximity to a buried loop which will cause the bistable circuit to switch to its second conductivity state to manifest the vehicle's presence for the duration of the vehicle's stay in the proximity of the loop, and a second timing circuit responsive to the second state of the bistable circuit operates to restore the bistable circuit to its first state so as to be receptive to a subsequent vehicle in the proximity of the loop while the first vehicle remains therein.

---

This invention relates in general to vehicle detector systems which function to detect the presence of a vehicle at a specific place or point in a highway. More particularly, the invention has to do with that type of detector system known as a loop system. In these systems, a coil or loop of wire is arranged in juxtaposition to the highway, usually embedded in the pavement. The loop forms part of an LC combination, which is powered in resonance by a suitable oscillator. The presence of a vehicle over the loop causes the inductance of the loop to go down, thereby effecting a phase angle shift of the sign wave voltage across the loop, with respect to its phase, with no vehicle present over the loop.

This phase angle shift is detected as a change in a DC voltage level elsewhere in the circuit to cause operation of a follower, such as a relay for controlling a traffic signal controller at a highway intersection.

Such loop detector systems now in general use have certain disadvantages. For example, the system has to be so arranged that it follows slow changes in the DC output level, with changes resulting from variation in climatic conditions and otherwise. The system is accordingly arranged such that it follows the slow changes but detects relative rapid changes in the DC output level. The result is that if a vehicle remains over the loop indefinitely, the detection must eventually expire, since the voltage in the circuitry always slowly changes to the original state.

Also, it has been customary to employ a fixed frequency oscillator to drive the loop circuit, which is tuned to resonance, by adjusting the amount of capacitance in parallel with the loop. This may involve the selection of one combination out of 300 possible combinations, the various capacitors being cut into and out of the circuit by operation of switches. This procedure of getting the loop circuit in resonance with the output of the fixed frequency oscillator is time-consuming, and otherwise not satisfactory.

Our invention has as an object a loop detector system employing an oscillator, the frequency of the output of which is quickly tuned to drive the loop LC circuit in resonance.

The invention has as a further object a loop detecting system embodying a unique circuit which functions to follow slow changes in the DC level output, but rapid change in the output is detected, and the detection will continue as long as the vehicle remains over the loop, and with no interruption in the power supply. This feature is important where the detector system is used to indicate the continuous flow of traffic on a highway, or conversely the interruption of the flow of traffic on the highway. This permits the traffic engineers to reroute traffic approaching a plugged highway, or plugged section thereof, or to take other appropriate steps to remedy the situation.

The invention has as a further object a loop detector system embodying an arrangement which functions, in the event a vehicle remains over the loop, to reset the system after the expiration of an interval of variable length, so that it will register detection of other vehicles subsequently moving in proximity to the loop. This feature of the invention is of importance in situations where a vehicle is likely to be parked over the loop, which in previous systems prevented detection of additional moving vehicles.

The invention consists in the novel features and in the combinations and constructions hereinafter set forth and claimed.

In describing this invention, reference is made to the accompanying drawings in which like characters designate corresponding parts in all the views.

Figure 1:
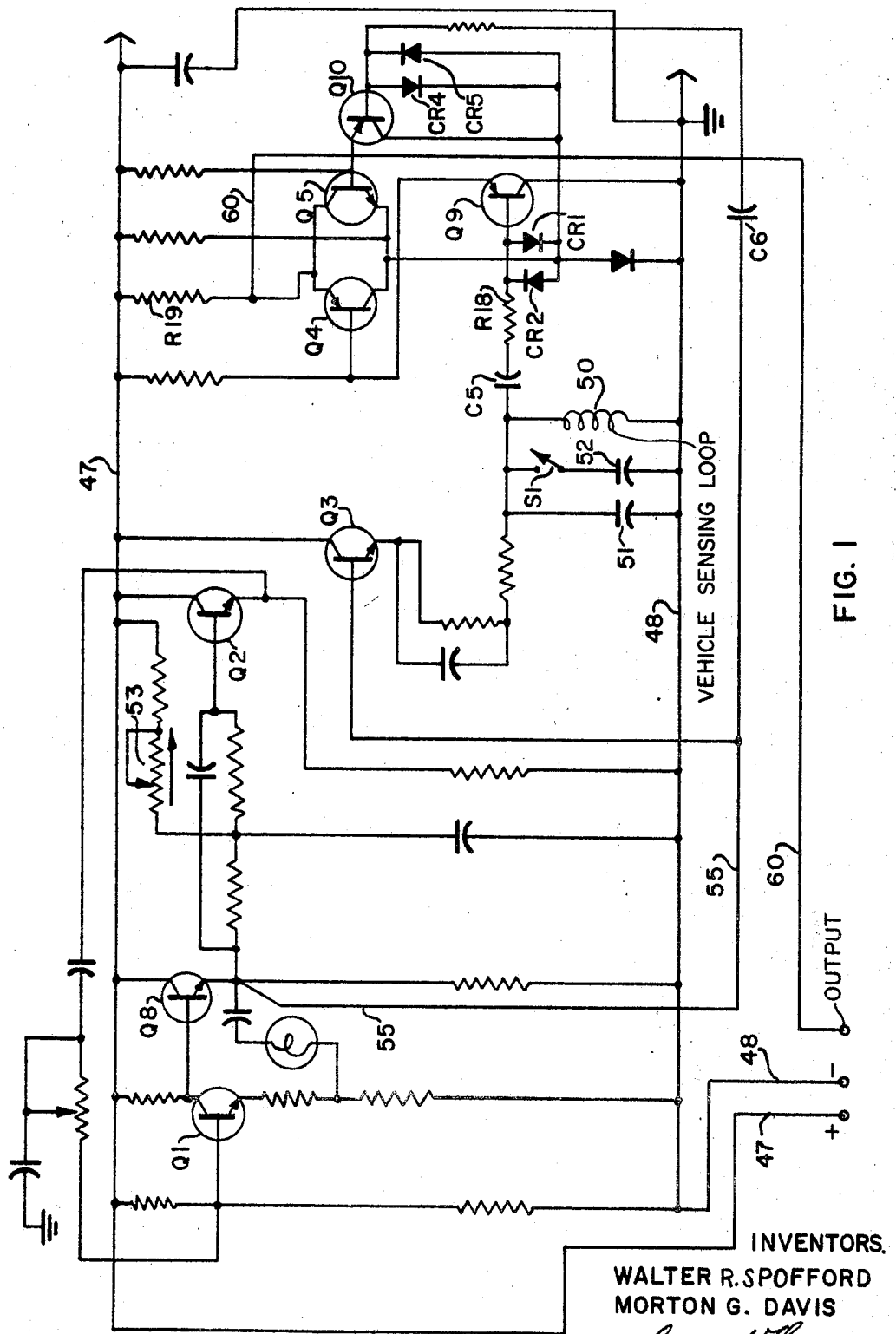
FIGURE 1 is a schematic diagram of the circuitry employed in the oscillator loop combination.

Referring to FIGURE 1, the positive side of the power supply is indicated at 47, and the negative side at 48. The loop is indicated at 50. A fixed capacitor 51 is connected in parallel with the loop, and there is a capacitor 52 which may be similarly connected by operation of the switch S1. The purpose of the capacitor 52 and switch S1 is simply to make an initial adjustment in the loop circuit to accommodate the number of loops, loop sizes and configuration, or the effect of unusual circumstances, such as abandoned railroad rails, metallic conduits, and the like, buried in the pavement.

The oscillator for driving the loop circuit includes the transistors Q1, Q2 and Q8. The oscillator may be tuned by varying the bridged T feed back circuit 53, as will be apparent. The frequency of the oscillator in the arrangement shown can be varied from 40 to 120 kilocycles per second. The output 55 from the oscillator is fed to the loop circuit through the amplifier Q3. The output from the oscillator is also connected to one end of a phase detection arrangement, including the transistors Q4 and Q5. Transistors Q9 and Q10 are common collector amplifiers, which cause minimum loading on the input signals and provide sufficient gain to drive the transistors Q4 and Q5 into a saturated switching mode. The output 55 of the oscillator is fed through coupling capacitor C6 to the base of transistor Q10, and serves as a reference signal for the phase detector. The output of the loop circuit is fed to the base of transistor Q9, through the coupling network, consisting of a capacitor C5 and resistor R18.

The sign wave signals fed to the bases of Q9 and Q10, respectively, are clipped by the back-to-back diodes CR1, CR2 and CR4, and CR5, so that the sign waves approximate square waves.

The transistors Q4 and Q5 share a common load resistor R19, and operate as a "NOR" circuit, and provide the phase detection function.

Figure 2:
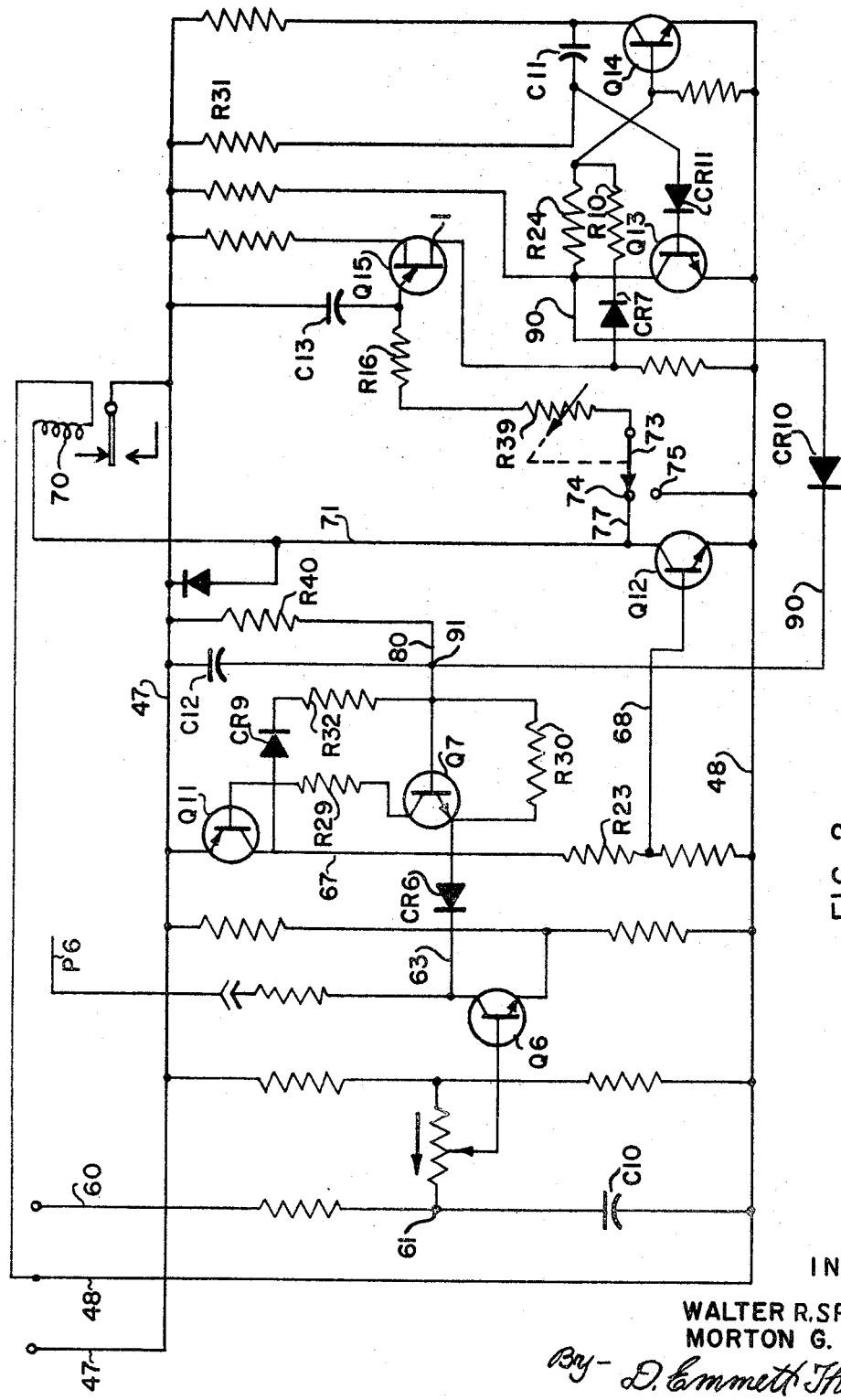
FIGURE 2 is a schematic diagram of the circuitry employed in the detection circuitry.

With this arrangement under normal operation, that is, with no vehicle positioned over the loop 50, the output 60 of the phase detector is a nominal square wave. When a vehicle moves into the field of the loop, the resulting phase shift causes the output of the phase detector to be off for a larger percentage of each cycle. This results in a decrease in the normal level charge on the integrating capacitor C10, FIGURE 2, with the result that the potential decrease at junction 61. This decreases the drive to the base of the normally conducting transistor Q6, which functions as an amplifier operating in common emitter configuration, with the result that the negative going signal is inverted, driving the conductor 63 more positive.

This change in the output from the oscillator loop combination is sensed by a bistable circuit means which functions to operate a load control device, as relay 70. In the arrangement shown in FIGURE 2, the bistable circuit means includes transistors Q7, Q11, capacitor C12, resistors R29, R30, R32, R40 and diodes CR6, CR9.

When no vehicle is present over the loop 50, the bistable circuit will remain in one stable state and, upon the presence of a vehicle in proximity to the loop, the bistable circuit will change from the first stable state to the second stable state and in doing so, will actuate the relay 70. In the first stable condition, the transistor Q6 is conducting because the conductor 63 connecting the collector of transistor Q6 to the diode CR6 is less positive than the emitter of Q7.

With no vehicle over the loop 50, and the output of the oscillator loop combination being at normal level, both transistors Q7 and Q11 are conducting. The emitter of Q11 is connected to the positive side 47 of the supply. Forward bias is maintained on Q11 from the collector of Q7. The collector of Q11 is connected to the base of transistor Q12 through conductor 67, resistor R23, conductor 68. The collector of Q12 is connected to the load control device 70, through conductor 71. The emitter of Q12 is connected to the ground 48. With this arrangement, the forward bias for Q12 is supplied from Q11, all whereby with no vehicle in proximity to the loop 50, relay 70 is held energized. This state of the bistable circuit is maintained by a feed back from the collector of Q11, through diode CR9, resistor R32 to the base of Q7.

With a vehicle in proximity to the loop 50, conductor 63 goes more positive, as previously explained, blocking the diode CR6, and accordingly removing the emitter of Q7 from the ground 48.

Reference is now made to a presence-mode selector switch 73 shown in engagement with a fixed contact 74, and being movable into engagement with a fixed contact 75. Contact 74 is connected by wire 77 to wire 71. The fixed contact 75 is connected to the ground 48.

When the bistable circuit is changed to the second state by transistor Q7 being rendered nonconductive by the presence of a vehicle over the loop 50, transistor Q11 and Q12 are rendered non-conductive, as will be apparent. The base bias supply for Q7 includes a self-adjusting voltage level control circuit. This circuit includes the capacitor C12 connected between the positive supply 47 and conductor 80 extending to the base of Q7, and functions to hold voltage on the base of Q7. This capacitor has substantial capacitance in the order of 150 microfarads. A resistor R40 is connected in parallel with the capacitor C12. It is of relatively high resistance, in the order of 10 megohms.

It has been pointed out above, that with a vehicle in proximity to the loop 50, transistors Q7, Q11 and Q12 are rendered nonconductive, dropping out the relay 70. If switch 73 is in engagement with contact 75, the bistable circuit will remain in this state, as long as the vehicle remains on the loop.

If switch 73 is positioned in engagement with contact 74, the voltage on 74 rises in a positive direction when transistor Q12 becomes nonconductive. Prior to the presence of a vehicle over the loop, Q12 is conducting heavily and accordingly, capacitor C13 was charged to the supply voltage of line 47. When Q12 cut off, the collector of Q12 was returned to the positive supply through relay 70, and capacitor C13 is now shunted by resistors R16, R39, and will begin to discharge at a rate determined by the setting of the adjustable resistor R39. As the discharge continues, the potential felt at the emitter of unijunction transistor Q15 will rise—that is, it will become more positive. When the emitter voltage of Q15 becomes sufficiently positive Q15 will turn on and conduct, and the potential on base 1 will go positive. This positive charge is coupled through diode CR7, resistor R10, to the base of Q14. Transistors Q13 and Q14 comprise a monostable multivibrator, which may have a period of about 50 microseconds. In the quiescent state—that is, no vehicle on the loop, Q14 is nonconducting and Q13 is conducting. The positive signal now applied to the base of Q14 will cause it to conduct.

The decrease in collector voltage on Q14 is transferred across capacitor C11, through diode CR11 to the base of Q13, turning Q13 off. C11 will now start to charge through R31. When the anode of CR11 becomes sufficiently positive, Q13 will be forced back into conduction, and the collector of Q13 will be driven in a negative direction. This negative going signal is fed to the base of Q14, forcing it off.

During the brief period of time that Q13 was nonconducting, its collector potential was positive, transmitting a positive pulse through conductor 90, diode CR10, to the junction 91 in the base circuit of Q7, effecting a raise in positive potential at junction 91 to reactivate transistor Q7 and accordingly, transistors Q11, Q12, for returning the bistable circuit to its first state, and again energizing relay 70.

It will be understood that during this resetting operation, the vehicle did not move off from the loop, so the new level on conductor 63 remains.

If the switch 73 is moved into engagement with the contact 75, it will be apparent that the monostable vibrator is rendered inoperable.

As previously pointed out, the long time constant in the combination of the capacitor C12 and resistor R40 will maintain a voltage at the junction 91 nearly sufficient to render transistor Q7 conductive. When Q7 is rendered conductive, it is maintained in that condition through the feed back from Q11. The C12, R40 combination will follow slow changes in the level at junction 61, but due to the long time constant will not follow a quick shift in the level at junction 61, with the result Q7 is cut off upon such quick shift at junction 61.

On the other hand, when the multivibrator timer is connected in the circuit, the positive pulse transmitted through conductor 90 to the junction 91 will raise the voltage on the base of the nonconducting transistor Q7, sufficient to render the transistor conducting, and the combination of the capacitor C12 and resistor R40 will effect a new voltage level at the junction 91, even though the voltage on the conductor 63 remains at the new level effected by the continued presence of the vehicle over the loop. Accordingly, when a subsequent vehicle moves in proximity to the loop, the transistor Q7 is again cut off.

With the arrangement described, it will be apparent that slow changes in the voltage of the output from the phase shift detector are compensated for by the self-adjusting voltage level control C12, R40 combination, but a rapid change effected by the vehicle moving over the loop will render the transistor Q7 nonconductive. The term rapid, in this sense, is relative. Actually, from the standpoint of traffic movement, the detector system will register the presence of a vehicle, even though from the standpoint of traffic movement, the vehicle is very slowly moving in proximity to the loop. Furthermore, when the transistor Q7 is rendered conducting, it is latched on, so to speak, by the back feed through the diode CR9, whereby the transistor cannot be rendered nonconducting, except by the change of the voltage level from the output circuit effected by the presence of the vehicle.

In other words, the transistor Q7 functions as a gating transistor for Q11, and the C12, R40 combination serves as a gating level for the transistor Q7, which gating level is self-adjusting, so that in the off position it is biased close to the turn-on point, and in the on position it is biased close to the turn-off point. From a different view, the C12, R40 combination holds the level once established by the feed through the diode CR9.

What we claim is:

1. In a magnetic vehicle detector of the phase shift type including an oscillator, a loop energized from said oscillator and disposed in proximity to the vehicular traffic flow so as to have its inductance affected by the vehicular metal, and a phase detector operative to detect a difference in the phase of the waveform of said oscillator and the waveform across the loop and produce a direct current potential in accordance with the magnitude of the phase difference, the improvement comprising:

(a) a variable threshold bistable circuit connected to said phase detector and operative responsive to a change in said direct current potential to change from a first conductivity status to a second conductivity status, the said bistable circuit including a resistor capacitor circuit having a substantial time constant connected to provide an adjustable bias for said bistable circuit at a potential level slightly removed from that level required to change the conductivity state of said bistable circuit from its first to its second state for all slow changes in said direct current potential, the said resistor capacitor circuit being ineffective to change the bias in response to rapid changes in the direct current potential caused by the presence of a vehicle in the proximity of the loop, and (b) means connected to said bistable circuit to manifest the presence of a vehicle when said bistable circuit resides in said conductivity state.

2. The apparatus of claim 1, wherein said bistable circuit comprises first and second transistors which are both conducting in the first stable state of said circuit and both non-conducting in the second stable state of said circuit, the said resistor capacitor circuit is connected to provide a bias for the base of said first transistor, and said variable direct current potential is connected to the emitter of said first transistor whereby the said capacitor will follow slow changes in the direct current potential to maintain a switching potential for said bistable circuit slightly removed from the level of the direct current potential to maintain said circuit in said first conductivity state for all slow changes.

3. In a magnetic vehicle detector of the phase shift type including an oscillator, a loop energized from said oscillator and disposed in proximity to the vehicular traffic flow so as to have its inductance affected by the vehicular metal, and a phase detector operative to detect a difference in the phase of the waveform of said oscillator and the waveform across the loop and produce a direct current potential in accordance with the magnitude of the phase difference, the improvement comprising:

(a) a variable threshold bistable circuit connected to said phase detector and operative responsive to a change in said direct current potential to change from a first conductivity status to a second conductivity status, the said bistable circuit including a resistor capacitor circuit having a substantial time constant connected to provide an adjustable bias for said bistable circuit at a potential level slightly removed from that level required to change the conductivity state of said bistable circuit from its first to its second state for all slow changes in said direct current potential, the said resistor capacitor circuit being ineffective to change the bias in response to rapid changes in the direct current potential caused by the presence of a vehicle in the proximity of the loop, (b) timing means connected to said bistable circuit and operative responsive to the said second stable state thereof to reset said bistable circuit after a predetermined time interval in preparation for the detection of a second vehicle in proximity to said loop before a first vehicle moves off the loop, and (c) means connected to said bistable circuit to manifest the presence of a vehicle when said bistable circuit resides in said conductivity state.

4. The circuit of claim 3 wherein the said timing circuit is so connected to said resistor capacitor circuit to apply a pulse bias to said circuit to reset the bistable circuit to its first state.

References Cited

UNITED STATES PATENTS 2,983,852   5/1961   Gray.
1,950,741   3/1934   Nein et al.

THOMAS B. HABECKER, *Primary Examiner.*

U.S. Cl. X.R.
331—110; 340—258